W. BROOKE.
GLASS MOLD.
No. 11,515. Patented Aug. 15, 1854.
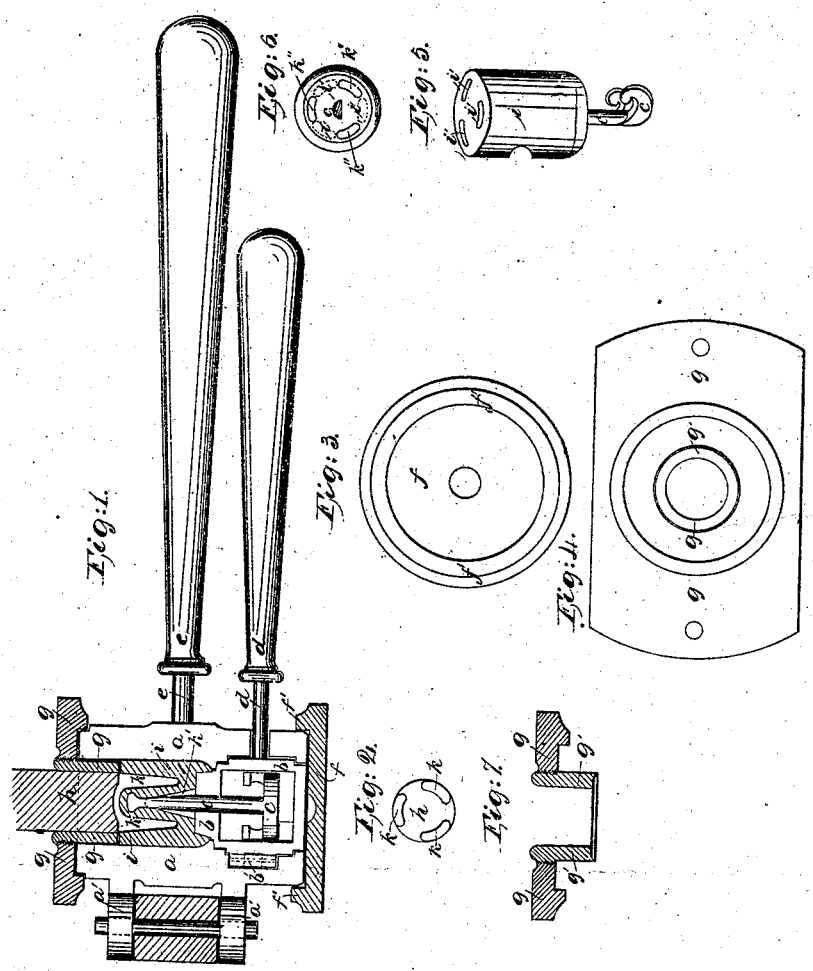

UNITED STATES PATENT OFFICE.

WILLIAM BROOKE, OF JERSEY CITY, NEW JERSEY.

GLASS-MOLD.

Specification of Letters Patent No. 11,515, dated August 15, 1854.

*To all whom it may concern:*

Be it known that I, WILLIAM BROOKE, of Jersey City, in the county of Bergen and State of New Jersey, have invented certain new and useful Improvements in Molds for Forming Insulators and other Articles Composed of Glass; and I do hereby declare that the following is a full and exact description thereof, reference being had to the annexed drawings, forming part of this specification, in which—

Figure 1 is a side sectional view of my improved mold; Fig. 2, bottom view of plunger; Fig. 3, vertical view of bottom plate; Fig. 4, bottom view of mold cap; Fig. 5, view of perforated insulator; Fig. 6, bottom view of insulator; Fig. 7 view of impressed cap.

$a$, mold for the glass; $a'$, hinges; $b$, nail-holder; $b'$, hinges; $c$, hook for sustaining telegraph wire; $d$, handles of hook-holder; $e$, handles of glass mold; $f$, bottom plate of shoulder; $g$, cap plate; $g'$ shoulder on cap plate; $h$, plunger; $i$, glass insulator; $i$ $k''$, perforations in the same; $k'$ prongs on nail holder; $k$, perforators.

In using my improvements the telegraph hook $c$, is put within the hook holder $b$, and the latter placed inside the mold $a$, in order to cast the glass and hook together in the usual manner. The hook-holder is closed by means of its handles, $d$, and the mold is shut by means of its handles $e$. After the mold is closed it is set upon the bottom-plate, $f$, within the shoulder, $f'$, which effectually prevents the mold from opening during the operation of compressing the glass. The hook, $c$, having been placed within its holder, $b$, and the latter placed within the mold, $a$, the mold, $a$, is now ready for the reception of the glass metal. The operator cuts off such a quantity of the metal as he judges will be sufficient to form an insulator, $i$, and drops it into the mold. The cap, $g$, is then laid on and the plunger, $h$, brought down by means of a press, whereby a proper degree of force is applied to the glass metal, which causes the glass to fill up the cavities of the mold provided the operator has previously placed a sufficient quantity of glass metal within the mold. The cap, $g$, usually extends straight across the top of the mold in the direction indicated by the dotted lines, (Fig. 1).

My improvement consists in screwing a shoulder, $g'$, into the cap, $g$. Now on introducing my improved cap, the shoulder, $g'$, acts as a plunger on the glass within the mold, forcing it down. The cap, $g$, with its shoulder, $g'$, having been introduced, the plunger, $h$, is next put in, which, pressing upon the glass, causes the latter to fill up every crevice of the mold. If the operator did not put enough of glass into the mold to form the insulator solid, by the use of my improved cap, $g$, the plunger, $h$, forces the glass to assume, on its exterior, the exact dimensions of the mold, though the interior or middle parts of the insulator would not be quite filled out, which is a matter of no consequence, it being desirable to produce the insulators with their exterior lengths and diameter all of exact sizes. By the use of the old cap it was a matter almost of impossibility to turn out insulators all of the exact exterior sizes. Some of them will be longer or shorter than the others.

The great advantage of having a shoulder, $g'$, screwing into the cap-piece, $g$, will be manifest to those acquainted with the art, from the fact that a longer or shorter shoulder may, at any time, be used with convenience, to suit the different sizes of articles desired to be produced. If I wish to produce an insulator, for example, of shorter dimensions than the one shown in the drawings, I unscrew the shoulder $g'$ and substitute a longer shoulder in its place; and when other articles are to be molded their dimensions can be regulated in the same manner.

Having thus described my invention I claim—

The shoulder, $g'$, when used in combination with the cap plate, $g$, and plunger, $h$, in the manner and for the purposes set forth.

WILLIAM BROOKE.

Witnesses:
 D. C. HITCHCOCK,
 A. E. BEACH,